United States Patent
Basu et al.

(10) Patent No.: US 11,267,737 B2
(45) Date of Patent: Mar. 8, 2022

(54) MOVING BED BIOFILM REACTOR SYSTEM FOR SELENIUM REMOVAL FROM WATER AND WASTEWATER

(71) Applicant: Headworks Bio, Inc., Houston, TX (US)

(72) Inventors: Somnath Basu, Houston, TX (US); Gerald Seidl, Houston, TX (US)

(73) Assignee: Headworks Bio Inc., Houston, TX (US)

( * ) Notice: Subject to any disclaimer, the term of this patent is extended or adjusted under 35 U.S.C. 154(b) by 0 days.

(21) Appl. No.: 16/894,826

(22) Filed: Jun. 7, 2020

(65) Prior Publication Data

US 2020/0339457 A1   Oct. 29, 2020

Related U.S. Application Data

(63) Continuation of application No. PCT/US2018/064497, filed on Dec. 7, 2018.
(Continued)

(51) Int. Cl.
*C02F 3/28* (2006.01)
*B01D 21/00* (2006.01)
(Continued)

(52) U.S. Cl.
CPC ........ *C02F 3/2833* (2013.01); *B01D 21/0012* (2013.01); *C02F 1/001* (2013.01); *C02F 3/006* (2013.01); *C02F 3/2806* (2013.01); *C02F 3/286* (2013.01); *C02F 2101/106* (2013.01); *C02F 2101/163* (2013.01); *C02F 2103/10* (2013.01);
(Continued)

(58) Field of Classification Search
CPC ........ C02F 3/2833; C02F 1/001; C02F 3/006; C02F 3/2806; C02F 3/286; C02F 2103/365; C02F 2305/06; C02F 2103/10; C02F 2103/18; C02F 2101/106; C02F 2101/163; C02F 2201/005; C02F 2209/006;
(Continued)

(56) References Cited

U.S. PATENT DOCUMENTS 5,556,536 A    9/1996 Turk
2008/0257820 A1   10/2008 Peeters et al.
(Continued)

OTHER PUBLICATIONS

PCT/US2018/064497; International Preliminary Report on Patentability, dated Jun. 9, 2020.

*Primary Examiner* — Fred Prince
(74) *Attorney, Agent, or Firm* — Fletcher Yoder P.C.

(57) ABSTRACT

In one embodiment, a system includes first anoxic moving bed biofilm reactor (MBBR) configured to receive a fluid containing selenium and to process the fluid via a first biofilm disposed on a first media to produce a first MBBR fluid by removing nitrogen from the fluid. The system further includes a second anoxic MBBR fluidly coupled to the first MBBR to receive the first MBBR fluid and to process the first MBBR fluid via a second biofilm disposed on a second media to produce a selenium enriched fluid, followed by a solid-liquid separation system to remove selenium in solid form as sludge and produce a treated effluent containing equal to or less than 5 micrograms of selenium per liter. The system includes a plurality of first sensors and first actuators disposed on the first MBBR, and a plurality of second sensors and second actuators disposed on the second MBBR.

20 Claims, 4 Drawing Sheets

Related U.S. Application Data

(60) Provisional application No. 62/596,029, filed on Dec. 7, 2017.

(51) Int. Cl.
  *C02F 1/00* (2006.01)
  *C02F 3/00* (2006.01)
  *C02F 101/10* (2006.01)
  *C02F 101/16* (2006.01)
  *C02F 103/10* (2006.01)
  *C02F 103/18* (2006.01)
  *C02F 103/36* (2006.01)

(52) U.S. Cl.
  CPC .... *C02F 2103/18* (2013.01); *C02F 2103/365* (2013.01); *C02F 2201/005* (2013.01); *C02F 2209/006* (2013.01); *C02F 2209/02* (2013.01); *C02F 2209/04* (2013.01); *C02F 2209/06* (2013.01); *C02F 2209/11* (2013.01); *C02F 2305/06* (2013.01)

(58) Field of Classification Search
  CPC .............. C02F 2209/02; C02F 2209/04; C02F 2209/06; C02F 2209/11; B01D 21/0012
  USPC ....... 210/614, 615, 616, 617, 143, 252, 259, 210/903
  See application file for complete search history.

(56) References Cited

U.S. PATENT DOCUMENTS

| | | | |
|---|---|---|---|
| 2014/0238931 A1* | 8/2014 | DiMassimo | ............ C02F 3/121 210/604 |
| 2014/0263043 A1 | 9/2014 | Mehta et al. | |
| 2016/0289107 A1* | 10/2016 | Seidl | ....................... C02F 3/085 |
| 2019/0382295 A1* | 12/2019 | Cannon | ................... C02F 3/006 |

* cited by examiner

MOVING BED BIOFILM REACTOR SYSTEM FOR SELENIUM REMOVAL FROM WATER AND WASTEWATER

This application is a Non-provisional Patent Application of U.S. Provisional Patent Application No. 62/596,029, entitled "MOVING BED BIOFILM REACTOR SYSTEM FOR SELENIUM REMOVAL FROM WATER AND WASTEWATER", filed Dec. 7, 2017, which is incorporated herein by reference in its entirety.

The present invention relates generally to the field of wastewater treatment systems. More particularly, the invention relates to techniques for applying moving bed biofilm reactor systems (MBBR) for selenium removal and/or capture.

BACKGROUND OF THE INVENTION

Certain fluid discharges such drainage water from mining operations; flue gas desulfurization (FGD) blowdown from power plants; desalters and sour water stripper effluents from petroleum refineries; and petroleum refinery treated effluents are major sources of selenium in wastewater. While some selenium is a nutrient to living cells, selenium in water is considered a priority pollutant by the Clean Water Act. For example, the Clean Water Act mandates a selenium discharge limit of less than 5 microgram per liter for industrial discharges. Selenium may be removed, for example, through processes such as reverse osmosis, co-precipitation with ferric chloride, via electrocoagulation, through evaporation/crystallization, deep water injection, ion exchange, constructed wetlands, and so on. It would be beneficial to improve processes for selenium removal.

In a number of the processes used for wastewater treatment, particulate matter may be caused to precipitate from the wastewater and collect on the bottom of a vessel. Reactor vessels for secondary treatment, for example, may hold wastewater in a reactor vessel, along with biological support media. The biological support media includes bacteria that proliferate and serve to treat the water in the reactor vessel by circulation of the water over the support media

BRIEF DESCRIPTION OF THE INVENTION

In one embodiment, a system includes an anoxic moving bed biofilm reactor (MBBR) configured to receive a fluid containing oxy-ions of selenium and to process the fluid via a first biofilm disposed on a first media to produce a first MBBR fluid by removing nitrogen from the fluid. The system further includes a second anoxic MBBR fluidly coupled to the first MBBR to receive the first MBBR fluid and to process the first MBBR fluid via a second biofilm disposed on a second media to produce an elemental selenium enriched fluid. The system additionally includes a plurality of first sensors and first actuators disposed on the first MBBR, and a plurality of second sensors and second actuators disposed on the second MBBR. The system also includes a control system configured to derive one or more first MBBR conditions and one or more second MBBR conditions based on signals from the plurality of first and second sensors, and to actuate the first and second actuators to produce the first MBBR fluid and the elemental selenium enriched fluid based on the first and second MBBR conditions.

In a second embodiment, a method includes receiving wastewater having selenium-containing ions at a wastewater treatment system comprising a first anoxic moving bed biofilm reactor (MBBR) and a second anoxic MBBR fluidly coupled to the first MBBR. The method further includes treating the wastewater in the first MBBR to produce a treated wastewater by removing nitrogen from the wastewater, wherein the first anoxic MBBR comprises a first biofilm disposed on a first media. The method also includes directing treated wastewater to the second MBBR, and treating the treated wastewater in the second anoxic MBBR to produce an elemental selenium enriched fluid.

In a third embodiment, a control system includes a processor. The processor is configured to receive one or more first signals from a plurality of first sensors disposed in a first anoxic moving bed biofilm reactor (MBBR), the one or more first signals representative of a condition of a first fluid being processed by the first MBBR. The processor is further configured to receive one or more second signals from a plurality of second sensors disposed in a second anoxic MBBR reactor, the one or more second signals representative of a condition of a second fluid being processed by the second MBBR. The processor is additionally configured to actuate a first actuator disposed in the first MBBR to remove nitrogen from the first fluid based on the first condition, and to actuate a second actuator disposed in the second MBBR to produce an elemental selenium enriched fluid based on the second condition.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

Wastewater treatment systems generally include several system components that treat and condition wastewater for disposal into the environment (e.g., lakes, rivers, ponds, etc.) and for a variety of uses (e.g., irrigation, recycling of water). There is an increasing need for improved wastewater treatment systems that can significantly reduce selenium found in certain wastewaters, while providing a high level of solids and biological material removal. There is a particular need for systems that can meet certain regulatory guidelines for selenium removal and fluid discharge, such as Clean Water Act (CWA) guidelines that mandate that industrial discharges do not exceed, for example, 5 microgram per liter.

The techniques described herein provide for a twin skid system process train, where a first skid integrates various MBBR techniques. The first MBBR skid may include two stages. A first stage may include biomedia suitable for denitrification of nitrates, followed by a second stage that may include biomedia suitable for removal and collection of selenium. A tank may then collect and/or mix the second stage effluent for delivery to the second skid. The second skid may then apply techniques suitable for solid liquid separation to collect or otherwise filter out the selenium from the effluent. By applying MBBR techniques, selenium removal may be completed at desired levels, such as levels mandated by the CWA, while the overall equipment and operation costs of the system may be decreased.

Figure 1:
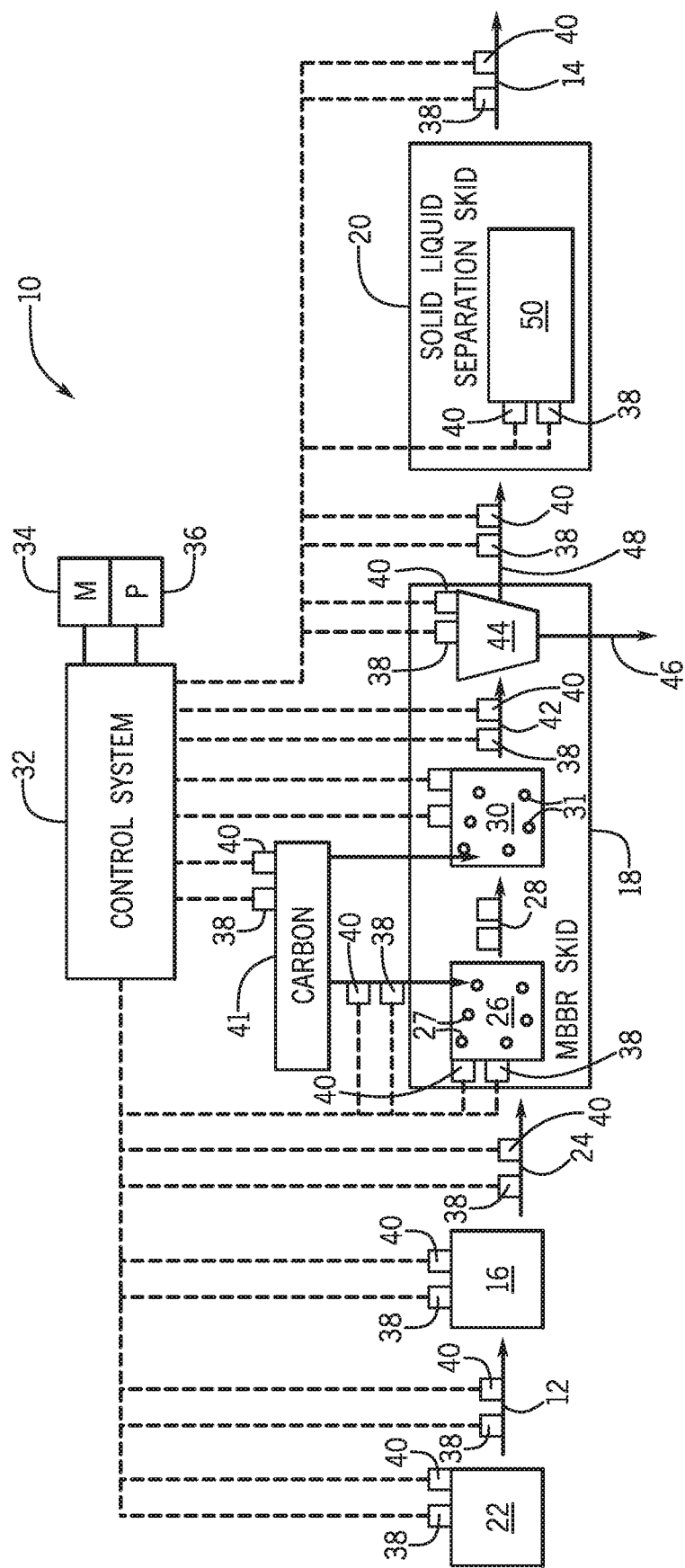
FIG. 1 is a block diagram of an embodiment of a wastewater treatment system including a moving bed biofilm reactor (MBBR) system having a pretreatment section, first skid treatment section, and a second skid treatment section.

Turning now to the drawings, and referring first to FIG. 1, an embodiment of a wastewater treatment system or train 10 is illustrated. The wastewater treatment system 10 is designed to receive influent 12 (e.g., processed fluid, wastewater, and the like) and to output treated fluid 14. In the illustrated embodiment, the wastewater treatment system 10 includes a pretreatment system 16, a MBBR skid 18, and a solid liquid separation skid 20. The pretreatment system 16 can be a screen, a collection tank, an equalization tank, and so on. An industrial system 22, such as a hydrocarbon processing system, a mining operation, a flue gas processing system, and so on, may produce wastewater. Accordingly, the influent 12 may include drainage from mining operations, effluents from sour water strippers, desalters and wastewater treatment plants of petroleum refineries, FGD blowdown water from fossil fuel power plants, and/or other sources that may contain selenium. It is to be noted that in addition to selenium, the influent 12 may include other contaminants that may have adverse health effects and/or that may interfere with selenium removal. For example, typically some principal contaminants and related measures are listed in the table below.

TABLE 1

Principal Contaminants and Related Measures

| Parameter | Average | Maximum | Minimum |
| --- | --- | --- | --- |
| Selenium Concentration, µg/L | 400 | 600 | 200 |
| Nitrate Concentration, mg/L | 17 | 27 | 8 |
| pH, su | 4 | 9 | 1 |
| Temperature, C. | 18 | 28 | 8 |
| Ca Hardness as mg/L CaCO3 | 8,000 | 13,000 | 4,000 |
| Oxigen Reduciont Potential (ORP), mV | 250 | 350 | 75 |

The influent 12 exiting the industrial production system 22 may enter a pretreatment system 16. The pretreatment system 16 may filter certain solids (e.g., via a screen), add certain chemicals, fluids, and so on. Pretreated fluid 24 may then be directed for further processing, e.g., bioprocessing, via the MBBR skid 18. More specifically, the pretreated fluid 24 may first be directed into a denitrification stage 26 for nitrate removal. The denitrification process is typically an anoxic process at approximately 0 to −50 millivolts (mV) such that nitrates are converted into nitrogen gas, for example, via the equation:

$$\mathrm{-NO3{-}+COD\rightarrow N_2+CO_2+H_2O} \qquad \text{Equation (1)}$$

Where chemical oxygen demand (COD) may be used via a source of carbon as an electron donor to transform the nitrate (NO3−) into nitrogen (N$_2$), and organic carbon to carbon dioxide (CO$_2$), and water (H$_2$O). The MBBR denitrification stage 26 may include a plurality of media 27, such as virgin high-density polyethylene media, suitable for providing a scaffold for biological growth. The MBBR denitrification stage 26 may utilize the attached growth on media 27 as a support for the formation of treatment biofilms. The media 27 is circulated by mixer(s) in a treatment reactor to provide for contact with the pretreated fluid 24 and substrate transfer to the biomass. The MBBR media 27 provides large surface area for biofilm formation and growth.

Denitrified effluent 28 from the MBBR denitrification stage 26 may then be directed to an MBBR selenium removal stage 30. The MBBR selenium removal stage 30 may also include plurality of media 31, such as virgin high density polyethylene media, suitable for providing a scaffold for biological growth. Similar to the denitrification stage 26, the MBBR selenium removal stage 30 may utilize the attached growth on media 31 as a support for the formation of treatment biofilms. The media 31 is also circulated by mixers (e.g., blade mixers, submersible pumps, other pumps, and so on) in a treatment reactor to provide for contact with the denitrified effluent 28 and substrate transfer to the biomass.

Selenium (Se) is a metalloid, Gr. VI element below sulfur (S) in the periodic table. Selenium's atomic number is 34 and its atomic weight is 79. Selenium occurs primarily in four oxidation states: 1) +6 as selenate (SeO$_4^{2-}$) ions dissolved in water. 2) +4 as selenite (SeO3,2−) ions dissolved in water. 3) 0 as elemental selenium (Se) as solid crystals. 4) −2 as selenide (Se2−) ions as hydrogen, or metallic selenides. Selenium also forms complexes with various inorganic and organic ligands, e.g. selenocyanates (SeCN−). In the influent 12 and denitrified effluent 28, selenium may exist as selenite and selenate ions.

Se removal may occur approximately between −100 to −150 mV with the following equation:

$$\mathrm{-SeO4,2/SeO3,2+COD\rightarrow Se+CO_2+H_2O} \qquad \text{Equation (2)}$$

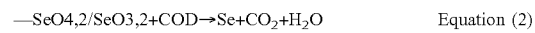

The techniques described herein may also provide for a control system 32 suitable for controlling operations of the system 10. The control system 32 may include one or more memories 34 storing computer code or instructions, and one or more processors 36 suitable for executing the computer code or instructions. The control system 32 may be communicatively coupled to one or more sensors 38 and operatively coupled to one or more actuators 40. The sensors 38 may include temperature sensors, voltage sensors, amperage sensors, chemical property (e.g., chemical makeup, chemical composition, quantity of certain chemicals) sensors, flow sensors, limit switches, pressure sensors, and the like. The actuators 40 may include valves, pumps, fans, positioners, and so on. In operation, the control system 32 may sense characteristics of the influent 12, pretreated effluent 24, denitrified effluent 28, and/or operational characteristics of the systems 16, 28, 30 (e.g., mixing rates, fluid flow rates, temperatures, pressures, fluid levels, and so on) to control the actuators 40.

The control system 32 may also control addition of a source of carbon 41. For example, the source of carbon 41 may store or include acetic acid, methanol, or other synthetic organic products, e.g. biodiesels. The source of carbon 41 may inject the carbon for ORP control. In the MBBR selenium removal stage 30, the ORP control may avoid SO$_4^{2-}$ reduction. The control system 32 may use certain techniques, such as feedforward or predictive control techniques, for operational control of the system 10. For example, artificial intelligence (AI) techniques such as neural networks, state vector machines (SVMs), fuzzy logic control, expert systems, genetic algorithms, data mining control, and the like, may be used. Neural networks and/or SVMs may be trained via empirical data and/or simulator data to recognize patterns in sensor 38 signals or data and then derive resulting control signals suitable for operating the actuators 40. For example, carbon may be added, fluid flow may be adjusted, and so on.

Expert systems may include rules, such as "if . . . then . . . " rules that encapsulate human knowledge of certain control, such as Oxidation Reduction Potential (ORP) control. The rules may include forward and/or backward chained rules that fire base on the sensor 38 signals or data and control the actuators 40. Fuzzy logic control may include fuzzy value and rules useful in feedforward control, such as in ORP control. Genetic algorithms may be evolved with empirical and/or simulator data, that may then enable control of the system 10 by using sensor 38 signals and/or data. Likewise, data mining may be used to build clusters and/or other structures useful in controlling the system 10, including ORP control.

The MBBR selenium removal stage 30 may enable the effluent 28 to be further processed via physico-chemical processes to treat the effluent 28, resulting in an elemental selenium rich fluid 42. Once the control system 32 derives that fluid 42 in the MBBR selenium removal stage 30 is ready, the control system 32 may transfer the fluid 42 into a storage and settling tank 44. Certain sludge 46, for example deposits at the bottom of the tank 44, may be removed from the tank 44 to recover or, remove selenium.

Effluent 48 from the MBBR skid may be directed, e.g., via the control system 32, to the solid liquid separation skid 20. The solid liquid separation skid 20 may include at least one stage, such as stage 50. The stage 50 may use one or more solid-liquid separation technique(s) to separate the selenium found in the effluent 48. For example, coagulant techniques, filtration techniques, and so on, may be used to further process the effluent 48 and capture the selenium. After processing via the MBBR skid 18 and the solid liquid separation skid 20, the resulting effluent 14 may now be at low selenium levels. Indeed, the system 10 may provide for effluent 14 having selenium at 5 microgram per liter or less. The effluent 14 may then conform to certain regulations, such as CWA regulations. It is to be understood that the system 10 subsystems such as the 26, 30, 44, 50 may be disposed in other configurations, such as inside of three skids or more, or may be incorporated into a single skid, one or more buildings, and so on.

Figure 2:
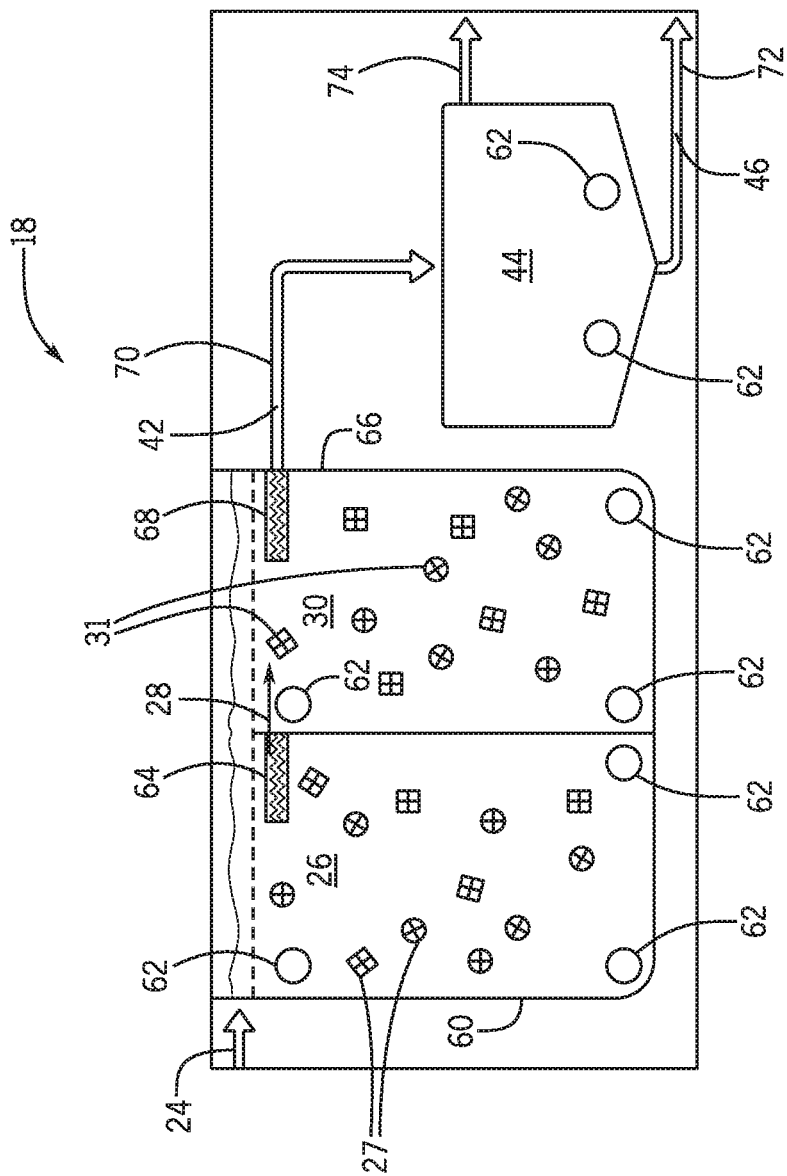
FIG. 2 is a block view of embodiments of first and second MBBRs that may be disposed in the first skid of FIG. 1.

FIG. 2 is a detailed block view of an embodiment of the MBBR skid 18 to illustrate certain features. In the depicted embodiment, the two MBBR anoxic stages 26 and 30 are shown, as well as the storage and settling tank 44. As described previously, the pretreated fluid 24 enters the first MBBR stage 26 for removal of nitrates. The MBBR stage 26 includes a plurality of media 27. The media 27 may include AC 920, AC 700, AC 515, AC 450 media, or a combination thereof, available from Headworks International, of Houston, Tex., U.S.A. The media 27 is circulated in a treatment reactor 60 to provide for contact with the pretreated fluid 24 and substrate transfer to the biomass. The MBBR media 27 provides not only large surface area for biofilm formation but also electrostatic surface charge. Mixing may be provided via mixing devices 62, which may include mixers, agitators, circulation conduits, pump systems, and so on. As the fluid 24 becomes denitrified, denitrified fluid 28 may enter screens 64 and flow into a treatment reactor 66 of the second MBBR stage 30.

The MBBR stage 30 includes a plurality of media 31. The media 31 may include AC 920, AC 700, AC 515, AC 450 media, or a combination thereof, available from Headworks International, of Houston, Tex., U.S.A. via biological processes to treat the effluent 28, resulting in an elemental selenium rich fluid 42. The fluid 42 may then enter the storage tank 44 via screens 68 and through conduit 70. The storage tank 44 may continuously settle selenium particles from the fluid 42 while sludge 46 may be collected via conduit 72. The fluid 42, may then exit the MBRR skid 18 as effluent 48 through conduit 74. As mentioned previously, the effluent 48 may be further treated by the solid liquid separation skid 20.

Figure 3:
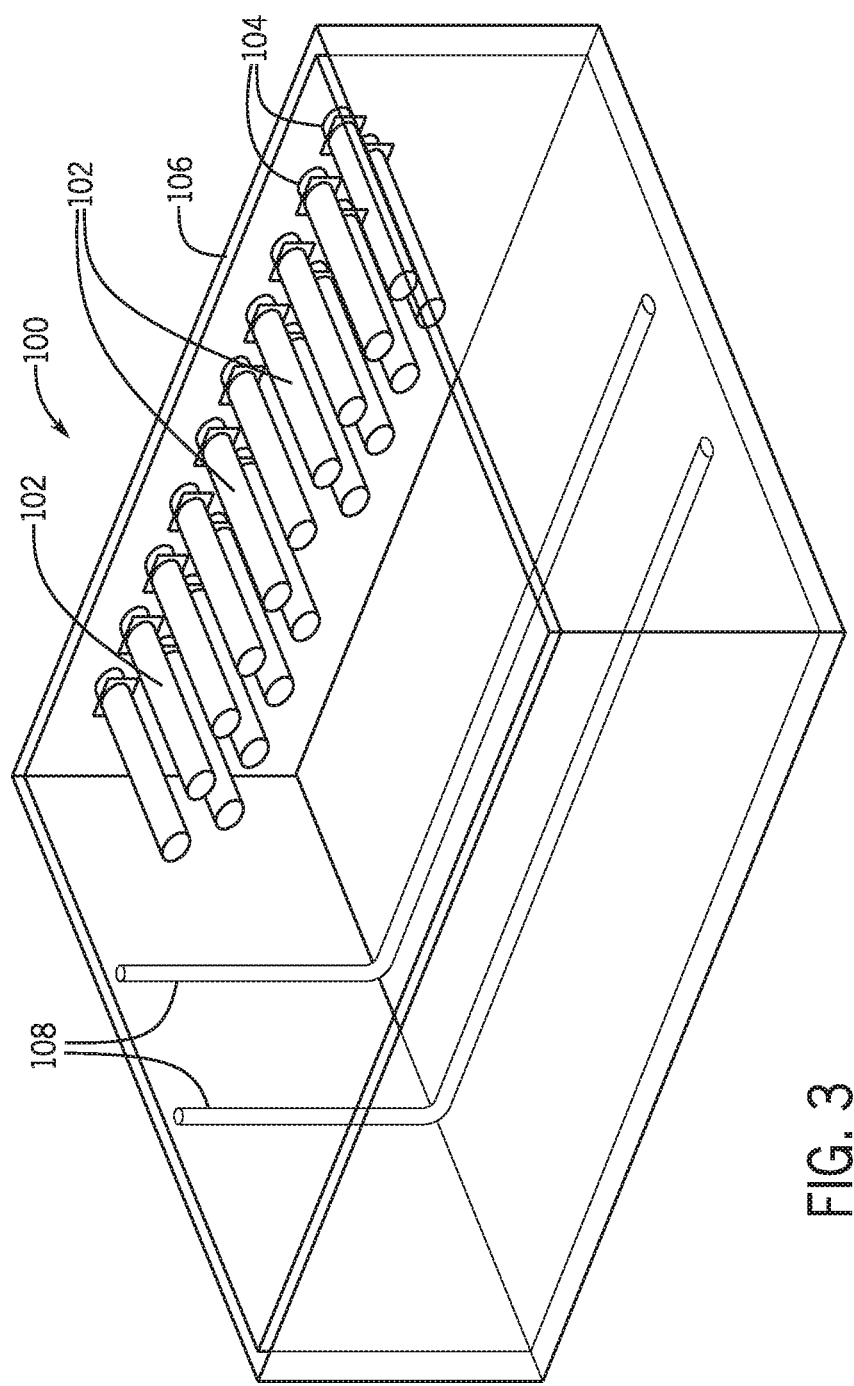
FIG. 3 is a perspective view of a vessel system that may be used as the first or the second MBBRs of FIG. 2.

It may be beneficial to illustrate further structural details of embodiments of the reactors 60, 66. Accordingly, FIG. 3 illustrates a perspective view of a reactor vessel 100, which may be used as either the reactor 60 and/or reactor 66 with the techniques described herein. As illustrated, the reactor vessel 100 includes a plurality of screens 102. The screens 102 are equivalent to the screens 64, 68 shown in FIG. 2. Indeed, the screens 102 may substantially block the media 27, 31 from exiting the reactor 100, while enabling the flow of fluid from the reactor 100. Accordingly, each screen 102 may be screening an opening 104 (or multiple openings) on a wall 106 to enable flow out off/into the reactor vessel 100.

Also shown are fluid conduits 108. The fluid conduits 108 may be used, for example, to introduce fluid, e.g. from external source of carbon (COD) into the reactor vessel 100 as well as to recirculate fluid in the reactor vessel 100. In certain embodiments, the fluid conduits 108 may be fluidly coupled to one or more pumps, suitable for moving and/or recirculating fluid in the reactor vessel 100. It is to be noted that the conduits 108 are example illustrations only. Any conduit 108 such as a straight pipe, curve pipe, and so on may be used. Likewise, the conduits 108 may be replaced or used in conjunction with mixers, agitators, pump systems, and so on. By recirculating fluid, such as fluid 24, 28, 42, the reactor vessel 100 may enable improved biological growth on the media 27, 31, as well as a more constant and improved exposure of the media 27, 31 to the fluid 24, 28, 42.

Figure 4:
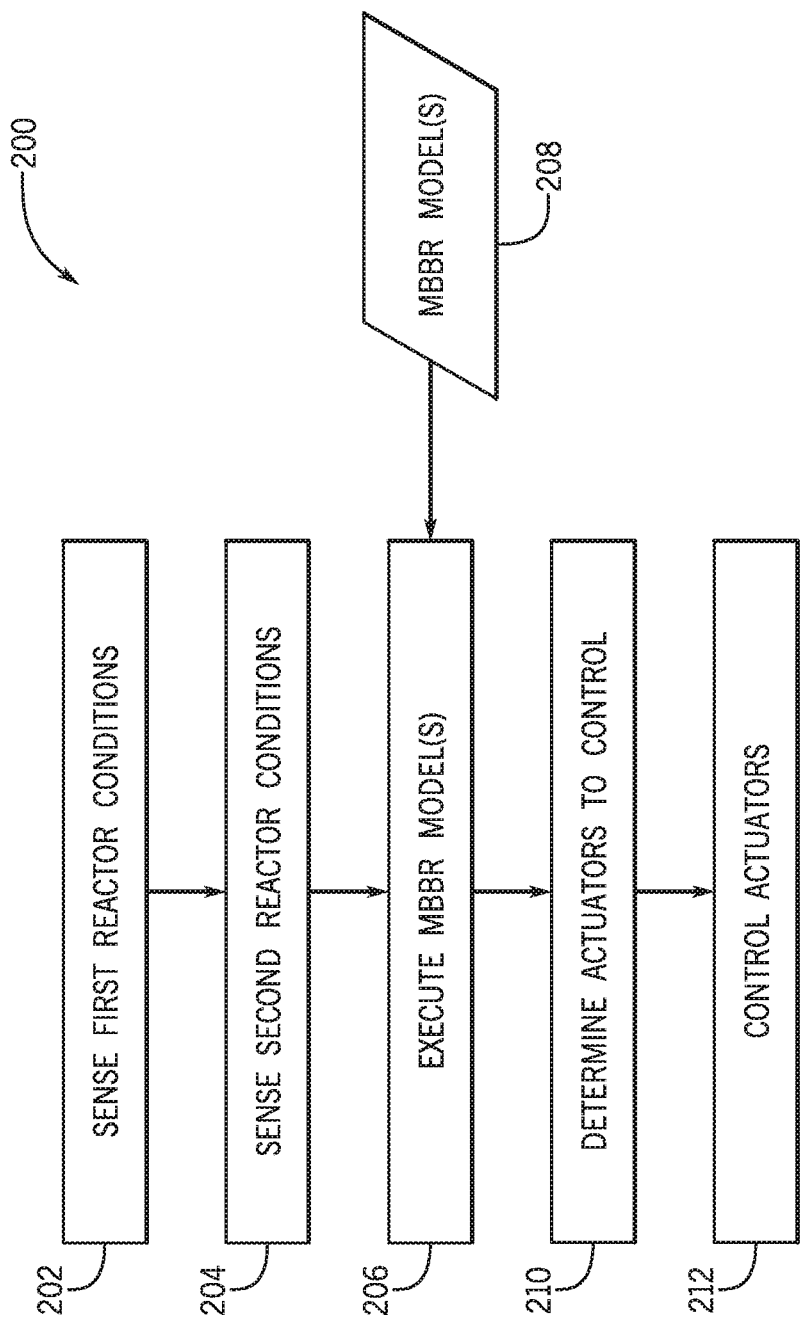
FIG. 4 is a flowchart of an embodiment, of a process suitable for removing selenium from certain fluids.

Turning now to FIG. 4, the figure illustrates an example, process 200 suitable for control, for example, of the system 10. The process 200 may be implemented as computer code or instructions stored in the memory 34 and executable via the processor 36. In the depicted embodiment, the process 200 may sense (block 202) reactor 26 conditions (e.g., first reactor conditions). For example, the sensors 38 may be used to derive a variety of measurements, such as water clarity, alkalinity, chemical composition, temperature, ORP-related measures, (e.g., volts, millivolts), and so on, found in the reactor 26.

Likewise, the process 200 may sense (block 204) reactor 30 conditions (e.g., second reactor conditions). As before, the sensors 38 may be used to derive a variety of measurements, such as water clarity, alkalinity, chemical composition, temperature, ORP-related measures, (e.g., volts, millivolts), and so on, found in the reactor 30. The process 200 may then execute (block 206) one or more MBBR models 208. The models 208 may include simulation models, neural networks, data mining models, state vector machine (SVM) models, genetic algorithms, expert systems (e.g., forward chained expert systems, backward chained expert systems), and so on. The models 208 may be executed (block 206) to control ORP so as to avoid, for example, $SO_4^{2-}$ reduction. Accordingly, the models may be used to determine (block 210) which of the actuators 40 to control, for example to add carbon to reactors 26 and 30, to transfer fluid between reactors 26 and 30, to increase or decrease mixing in the reactors 26 and 30 and/or the storage tank 44, to transfer fluid to the second skid 20, to add other chemicals to the reactors 26, 30, and so on.

The process 200 may then control (block 212) the actuators 40. For example, the process 200 may modulate certain valves/pumps to add more carbon to the reactors 26 and/or 30, the process 200 may turn off certain valves/pumps to stop adding carbon to the reactors 26 and/or 30. The process 200 may also turn on valves, pumps, and so on, to transfer fluid from the reactors 26 and 30, or into the reactors 26 and 30. The process 200 may also increase or decrease pump/motor speeds to increase or decrease mixing in the reactors 26 and 30. By sensing data incoming from sensors 38 and then deriving certain MBBR conditions via the MBBR model(s) 208, the process 200 may then adjust conditions in the MBBR reactors 26 and 30 to more efficiently provide for selenium removal.

This written description uses examples to disclose the present embodiments, including the best mode, and also to enable any person skilled in the art to practice the disclosed embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a first anoxic moving bed biofilm reactor (MBBR) configured to receive a fluid containing selenium and to process the fluid via a first biofilm disposed on a first media to produce a first MBBR fluid by removing nitrogen from the fluid;
   a second anoxic MBBR fluidly coupled to the first MBBR to receive the first MBBR fluid and to process the first MBBR fluid via a second biofilm disposed on a second media to produce a selenium enriched fluid;
   a plurality of first sensors and first actuators disposed on the first MBBR;
   a plurality of second sensors and second actuators disposed on the second MBBR; and
   a control system configured to derive one or more first MBBR conditions and one or more second MBBR conditions based on signals from the plurality of first and second sensors, and to actuate the first and second actuators to produce the first MBBR fluid and the selenium enriched fluid based on the first and second MBBR conditions.

2. The system of claim 1, wherein at least one of the first actuators comprises a first valve fluidly coupled to a source of carbon in the form of an organic acid, an alcohol, a biodiesel, or a combination thereof, and wherein the control system is configured to add carbon via the valve into the first MBBR based on the first MBBR conditions.

3. The system of claim 2, wherein at least one of the second actuators comprises a second valve fluidly coupled to the source of carbon, and wherein the control system is configured to add carbon via the second valve into the second MBBR based on the first MBBR conditions, the second MBBR conditions, or a combination thereof.

4. The system of claim 1, comprising a settling tank fluidly coupled to the second MBBR to receive the selenium enriched fluid, wherein the settling tank comprises an agitator to agitate the selenium enriched fluid.

5. The system of claim 4, comprising a solid liquid separation system configured to receive the selenium enriched fluid from the settling tank and to separate selenium from the selenium enriched fluid via filtering.

6. The system of claim 5, wherein the first MBBR, the second MBBR, and the settling tank are disposed in a first skid and the solid liquid separation system is disposed in a second skid.

7. The system of claim 1, wherein the control system is configured to execute one or more MBBR models to derive the first and the second MBBR conditions by providing the one or more MBBR models with the signals as input.

8. The system of claim 7, wherein the one or more MBBR models comprise a neural network, a state vector machine (SVM), an expert system, a fuzzy logic model, a genetic algorithm, a data mining model, a simulation model, or a combination thereof.

9. The system of claim 7, wherein the one or more models are configured to control oxidation reduction potential (ORP) so as to minimize or eliminate $SO_4^{2-}$ reduction in the first MBBR, the second MBBR, or a combination thereof.

10. The system of claim 1, comprising a pretreatment system, wherein the pretreatment system is configured to pretreat the fluid and to deliver pretreated fluid to the first MBBR.

11. A method for wastewater treatment, comprising
   receiving wastewater having selenium at a wastewater treatment system comprising a first anoxic moving bed biofilm reactor (MBBR) and a second anoxic MBBR fluidly coupled to the first MBBR;
   treating the wastewater in the firsts MBBR to produce a treated wastewater by removing nitrogen from the wastewater, wherein the first anoxic MBBR comprises a first biofilm disposed on a first media;
   directing treated wastewater to the second MBBR; and treating the treated wastewater in the second anoxic MBBR to produce a selenium enriched fluid.

12. The method of claim 11, comprising directing the selenium enriched fluid to a mixing tank; and mixing the selenium enriched fluid in the mixing tank to produce a mixed fluid.

13. The method of claim 12, comprising directing the mixed fluid to a solid liquid separation system, and separating the selenium from the mixed fluid via the solid liquid separation system.

14. The method of claim 11, comprising adding a carbon in the form of a an organic acid, an alcohol, a biodiesel, or a combination thereof, to the first MBBR, to the second MBBR, or to a combination thereof, to control oxidation reduction potential (ORP) so as to minimize or eliminate $SO_4^{2-}$ reduction in the first MBBR, the second MBBR, or the combination thereof.

15. The method of claim 14, comprising deriving a first condition of the wastewater in the first MBBR, deriving a second condition of the treated wastewater in the second MBBR, or a combination thereof, and adding the carbon based on the first condition, the second condition, or a combination thereof.

16. A control system, comprising:
   a processor configured to:
   receive one or more first signals from a plurality of first sensors disposed in a first anoxic moving bed biofilm reactor (MBBR), the one or more first signals representative of a condition of a first fluid being processed by the first MBBR;
   receive one or more second signals from a plurality of second sensors disposed in a second (MBBR), the one or more second signals representative of a condition of a second fluid being processed by the second MBBR;

actuate a first actuator disposed in the first MBBR to remove nitrogen from the first fluid based on the first condition; and actuate a second actuator disposed in the second MBBR to produce a selenium enriched fluid based on the second condition.

17. The system of claim 16, wherein the one or more first signals, the one or more second signals, or a combination thereof, are representative of an oxidation reduction potential (ORP), a temperature, a pH, a clarity, a chemical composition, or a combination thereof.

18. The system of claim 16, wherein the first actuator provides carbon to the first MBBR, wherein the second actuator provides carbon to the second MBBR, or a combination thereof.

19. The system of claim 16, wherein the processor is configured to control oxidation reduction potential (ORP) so as to minimize or eliminate $SO_4^{2-}$ reduction in the first MBBR, the second MBBR, or a combination thereof, by actuating the first actuator, the second actuator, or the combination thereof.

20. The system of claim 16, wherein the processor is configured to direct the selenium enriched fluid to a solid liquid separation system, and wherein the solid liquid separation system is configured to separate the selenium from the selenium enriched fluid.

* * * * *